United States Patent
Sloan

(10) Patent No.: US 10,619,293 B2
(45) Date of Patent: *Apr. 14, 2020

(54) IN-LINE DIGITAL PRINTING SYSTEM FOR TEXTILE MATERIALS

(71) Applicant: Kornit Digital Ltd., Rosh HaAyin (IL)

(72) Inventor: Donald D. Sloan, Platte City, MO (US)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,399

(22) Filed: Feb. 5, 2019

(65) Prior Publication Data

US 2019/0169794 A1 Jun. 6, 2019

Related U.S. Application Data

(63) Continuation of application No. 15/968,778, filed on May 2, 2018, now Pat. No. 10,246,821, which is a continuation of application No. 15/328,943, filed as application No. PCT/IL2015/050758 on Jul. 23, 2015, now Pat. No. 9,988,761, which is a continuation of application No. 14/341,516, filed on Jul. 25, 2014, now Pat. No. 9,453,301.

(51) Int. Cl.

| | |
|---|---|
| *D06P 1/52* | (2006.01) |
| *D06P 5/02* | (2006.01) |
| *D06P 5/00* | (2006.01) |
| *B05D 1/02* | (2006.01) |
| *B05D 3/00* | (2006.01) |
| *B05D 3/02* | (2006.01) |
| *B05D 5/04* | (2006.01) |
| *B05D 7/24* | (2006.01) |
| *D06P 1/54* | (2006.01) |
| *D06P 1/642* | (2006.01) |
| *D06P 3/00* | (2006.01) |
| *D06P 5/30* | (2006.01) |
| *B41J 2/01* | (2006.01) |
| *B41J 3/407* | (2006.01) |
| *C09D 11/04* | (2006.01) |
| *C09D 11/102* | (2014.01) |
| *C09D 11/107* | (2014.01) |
| *C09D 11/322* | (2014.01) |
| *D06P 1/00* | (2006.01) |

(52) U.S. Cl.
CPC .............. *D06P 1/5257* (2013.01); *B05D 1/02* (2013.01); *B05D 3/007* (2013.01); *B05D 3/0254* (2013.01); *B05D 5/04* (2013.01); *B05D 7/24* (2013.01); *B41J 2/01* (2013.01); *B41J 3/4073* (2013.01); *C09D 11/04* (2013.01); *C09D 11/102* (2013.01); *C09D 11/107* (2013.01); *C09D 11/322* (2013.01); *D06P 1/0004* (2013.01); *D06P 1/5264* (2013.01); *D06P 1/54* (2013.01); *D06P 1/6426* (2013.01); *D06P 3/00* (2013.01); *D06P 5/002* (2013.01); *D06P 5/02* (2013.01); *D06P 5/30* (2013.01); *B05D 2502/00* (2013.01)

(58) Field of Classification Search
CPC ........ D06P 1/5257; D06P 5/02; D06P 1/0004; D06P 1/6426; D06P 1/54; D06P 5/30; D06P 3/00; D06P 5/002; D06P 1/5264; B05D 2502/00; B05D 7/24; B05D 3/0254; B05D 1/02; B05D 5/04; B05D 3/007; C09D 11/322; C09D 11/04; C09D 11/102; C09D 11/107; B41J 2/01; B41J 3/4073
USPC ......................................... 524/17
See application file for complete search history.

(56) References Cited

U.S. PATENT DOCUMENTS

| | | | |
|---|---|---|---|
| 4,438,169 | A | 3/1984 | Daniels et al. |
| 5,439,739 | A | 8/1995 | Furukawa et al. |
| 8,092,003 | B2 | 1/2012 | Sloan |
| 2003/0207629 | A1 | 11/2003 | Sobieski et al. |
| 2004/0055505 | A1 | 3/2004 | Lye et al. |
| 2005/0197419 | A1* | 9/2005 | Graziano ............. C09D 11/101 522/74 |
| 2008/0122880 | A1 | 5/2008 | Sloan |
| 2009/0226948 | A1 | 9/2009 | Reichert et al. |
| 2012/0120168 | A1 | 5/2012 | Kachi et al. |
| 2014/0368841 | A1 | 12/2014 | Ojima et al. |
| 2016/0023454 | A1 | 1/2016 | Sloan |
| 2017/0218564 | A1 | 8/2017 | Sloan |
| 2018/0245283 | A1 | 8/2018 | Sloan |

FOREIGN PATENT DOCUMENTS

| | | |
|---|---|---|
| CN | 1664029 | 9/2005 |
| CN | 101531848 | 9/2009 |
| CN | 101760079 | 6/2010 |
| CN | 102127333 | 7/2011 |

(Continued)

OTHER PUBLICATIONS

International Preliminary Report on Patentability dated Feb. 9, 2017 From the International Bureau of WIPO Re. Application No. PCT/IL2015/50758. (7 Pages).

(Continued)

*Primary Examiner* — Hui H Chin

(57) ABSTRACT

Compositions for and methods of digitally printing an ink image onto a woven textile material are provided. A base application is applied to the surface of a woven textile material, especially one comprising synthetic resin fibers prior to application of an ink image layer. The base application comprises an acrylic latex material that is formulated to be printed on with a digital ink while still wet, thereby eliminating the need for an intermediate drying cycle in between base application deposit and printing of the ink image.

18 Claims, 1 Drawing Sheet

(56) References Cited

FOREIGN PATENT DOCUMENTS

| CN | 102443314 | 5/2012 |
|---|---|---|
| CN | 103153635 | 6/2013 |
| EP | 1571184 | 9/2005 |
| JP | 58-036277 | 3/1983 |
| JP | 2005-290362 | 10/2005 |
| JP | 2005-299008 | 10/2005 |
| JP | 2013-220643 | 10/2013 |
| JP | 2014-501636 | 1/2014 |
| WO | WO 97/40108 | 10/1997 |
| WO | WO 2008/033569 | 3/2008 |
| WO | WO 2012/057732 | 5/2012 |
| WO | WO 2015/025310 | 2/2015 |
| WO | WO 2016/013016 | 1/2016 |

OTHER PUBLICATIONS

International Search Report and the Written Opinion dated Dec. 18, 2015 From the International Searching Authority Re. Application No. PCT/IL2015/50758.
Notice of Allowance dated Mar. 2018 From the US Patent and Trademark Office Re. U.S. Appl. No. 15/328,943. (9 pages).
Notice of Allowance dated Dec. 13, 2018 From the US Patent and Trademark Office Re. U.S. Appl. No. 15/968,778. (8 pages).
Notice of Non-Compliant Amendment (37 CFR 1.121) dated Aug. 21, 2015 From the US Patent and Trademark Office Re. U.S. Appl. No. 14/341,516.
Notification of Office Action and Search Report dated Aug. 30, 2018 From the State Intellectual Property Office of the People's Republic of China Re. Application No. 201580040537.3. (6 Pages).
Official Action dated Nov. 2, 2017 From the US Patent and Trademark Office Re. U.S. Appl. No. 15/328,943. (11 pages).
Official Action dated Dec. 3, 2015 From the US Patent and Trademark Office Re. U.S. Appl. No. 14/341,516.
Official Action dated Apr. 21, 2016 From the US Patent and Trademark Office Re. U.S. Appl. No. 14/341,516.
Official Action dated Sep. 8, 2018 From the US Patent and Trademark Office Re. U.S. Appl. No. 15/968,778. (8 pages).
Restriction Official Action dated Jan. 28, 2015 From the US Patent and Trademark Office Re. U.S. Appl. No. 14/341,516.
Supplementary European Search Report and the European Search Opinion dated Nov. 24, 2017 From the European Patent Office Re. Application No. 15824271.9. (10 Pages).
Translation dated Sep. 9, 2018 of Notification of Office Action dated Aug. 30, 2018 From the State Intellectual Property Office of the People's Republic of China Re. Application No. 201580040537.3. (3 Pages).
Written Opinion dated Mar. 29, 2017 From the Ministry of Science and Technology, National Office of Intellectual Property of the Socialist Republic of Vietnam Re. Application No. 1-2017-00559 and its Translation into English. (29 Pages).
Huang et al. Database WPI [Online], XP002775120, Week 200970, Database Accession No. 2009-P08390, 2 P., Mar. 24, 2009. & CN 101531848.
Translation dated Jul. 25, 2019 of Notice of Reasons for Rejection dated Jun. 25, 2019 From the Japan Patent Office Re. Application No. 2017-524141. (4 Pages).
Notification of Office Action and Search Report dated May 22, 2019 From the State Intellectual Property Office of the People's Republic of China Re. Application No. 201580040537.3. (7 Pages).
Translation Dated May 30, 2019 of Notification of Office Action dated May 22, 2019 From the State Intellectual Property Office of the People's Republic of China Re. Application No. 201580040537. 3. (5 Pages).
Notice of Reasons for Rejection dated Jun. 25, 2019 From the Japan Patent Office Re. Application No. 2017-524141. (4 Pages).
Examination Report dated Nov. 11, 2019 From the Intellectual Property Office of the Philippines, Bureau of Patents, Intellectual Property Center Re. Application No. 1/2017/500145.
Notification of Decision on Rejection dated Sep. 17, 2019 From the State Intellectual Property Office of the People's Republic of China Re. Application No. 201580040537.3. (4 Pages).
Translation dated Sep. 22, 2019 of Notification of Decision on Rejection dated Sep. 17, 2019 From the State Intellectual Property Office of the People's Republic of China Re. Application No. 201580040537.3. (7 Pages).

* cited by examiner

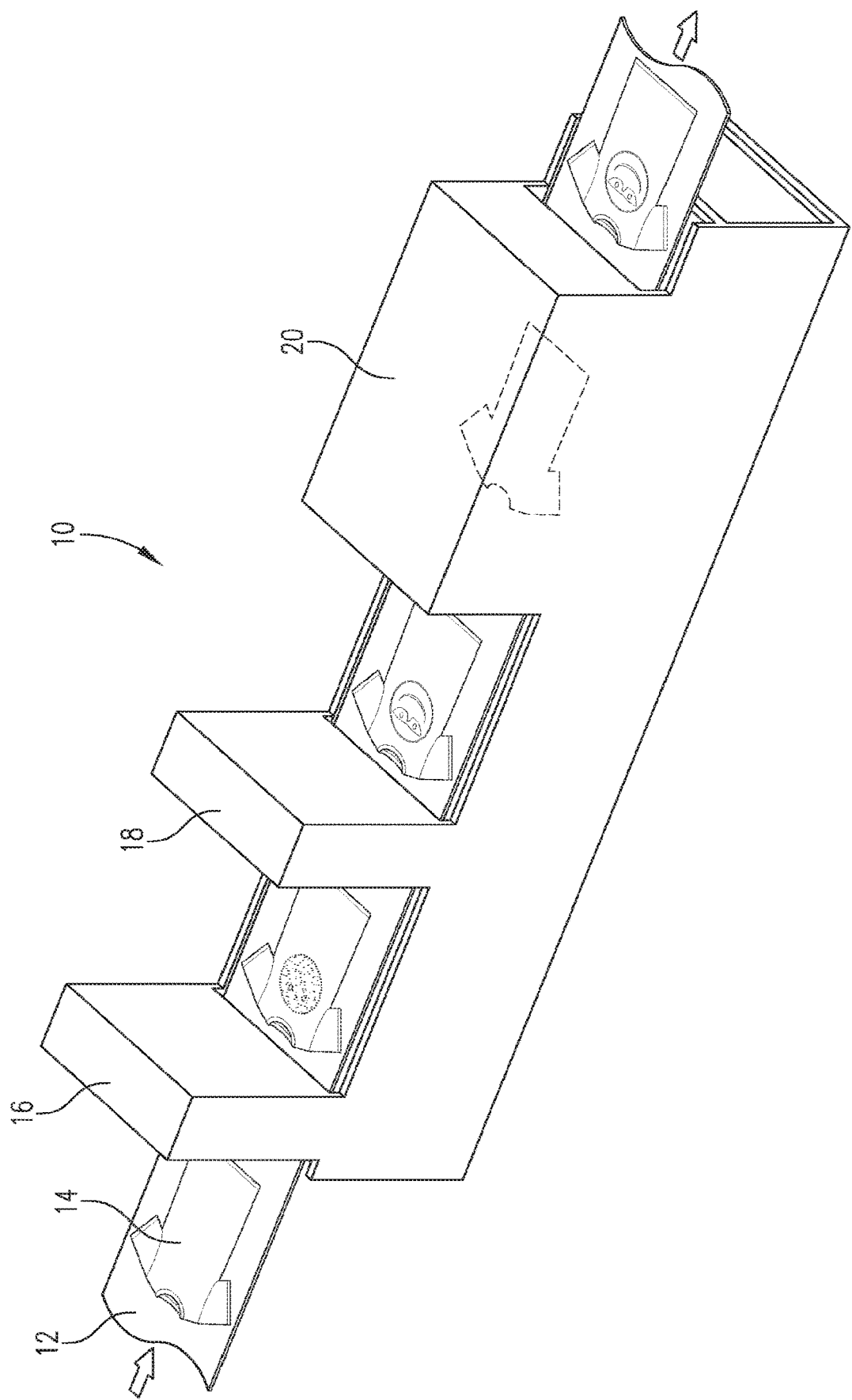

IN-LINE DIGITAL PRINTING SYSTEM FOR TEXTILE MATERIALS

RELATED APPLICATIONS

This application is a continuation of U.S. patent application Ser. No. 15/968,778 filed on May 2, 2018, which is a continuation of U.S. patent application Ser. No. 15/328,943 filed on Jan. 25, 2017, now U.S. Pat. No. 9,988,761, which is a National Phase of PCT Patent Application No. PCT/IL2015/050758 having International Filing Date of Jul. 23, 2015, which is a continuation of U.S. patent application Ser. No. 14/341,516, filed on Jul. 25, 2014, now U.S. Pat. No. 9,453,301. The contents of the above applications are all incorporated by reference as if fully set forth herein in their entirety.

FIELD AND BACKGROUND OF THE INVENTION

The present invention is generally directed toward compositions for and methods of digitally printing an ink image onto a woven textile material, especially those comprising synthetic resin fibers. In particular, digital printing systems are disclosed that utilize a base application comprising an acrylic latex material that is formulated to be imprinted upon with digital ink while still wet, that is, before being fully cured. Accordingly, the base application permits rapid printing of an ink image onto the textile material without an intermediate drying or baking cycle in which the base application is fully dried or cured prior to deposit of the ink image layer.

Woven textiles made from synthetic resin materials have been utilized for sometime in the manufacture of articles of clothing. However, advances in synthetic fiber technologies have resulted in the ability to manufacture clothing, and shirts in particular, having enhanced performance characteristics, such as in wicking moisture away from the wearer's body. These improved performance characteristics have increased synthetic resin textile popularity in many areas, especially athletic wear.

The synthetic resin textile materials often contain dyes that impart a desired color to the fabric. It is also quite common for the clothing articles formed from the dyed textiles to bear imprinted images, such as artwork, text, logos, etc., that customize the article based upon the user's preferences. Screen-printing of these various images is a popular printing method used to provide this customization of clothing articles, especially T-shirts. However, screen-printing of images has certain drawbacks. Preparation of the screens required for the printing process can be quite expensive depending upon the complexity of the image to be printed. Thus, in order to be economically feasible, large quantities of the particular clothing article must be prepared. Accordingly, screen-printing is generally not ideal for single or small production runs. Also, inks used in screen printing operations generally are more viscous and must be deposited onto the textile material in relatively thick layers that can negatively affect the feel of the clothing article as it is being worn.

In view of these drawbacks, digital printing has been explored as an alternative to screen-printing for creation of images on woven textile materials. However, present digital printing technologies for textile materials, especially synthetic resin textile materials, also exhibit certain shortcomings. The inks used in digital printing are generally less viscous than screen-printing inks and may tend to penetrate more deeply into the textile fibers thereby degrading image quality. In order to prevent the inks from absorbing too deeply into the fibers, curing of the resin systems making up the inks may be accelerated by exposing the textile material to elevated temperatures. Commonly, the textile material is passed through a dryer operating at a temperature of between 285-300° F. immediately after the image is imprinted. However, exposure to these elevated temperatures, which is commonly for 6-8 minutes, can deactivate the textile dye system causing the dye to weep into and degrade the printed image. Particularly in the context of synthetic resin textile materials, long-term adhesion of the cured ink image to the textile fibers can also be problematic. If the adherence of the ink to the textile fibers is weak, the clothing article will exhibit poor washability as the ink image may crack, fade, or release upon undergoing plural wash/dry cycles.

Image transfer systems, wherein the ink image is first imprinted upon a temporary carrier substrate and then subsequently transferred to the clothing article, have also been proposed. But, these systems are generally more labor and material-intensive, thereby adding expense to the overall cost of producing the clothing article. Accordingly, there is a real and unfulfilled need in the art for a system of printing an image onto a textile material that avoids the aforementioned problems with existing screen-printing and digital printing technologies.

SUMMARY OF THE INVENTION

The present invention overcomes the aforementioned shortcomings and provides a digital printing system for printing an image onto a textile material, particularly a woven textile material, and even more particularly, a woven synthetic resin textile material, in an efficient and economical manner.

According to one embodiment of the present invention there is provided a base application for use in a system for digitally printing an ink image on a woven textile material. The base application comprises between about 30% to about 70% by weight of an aqueous acrylic latex material; between about 2.5% to about 20% by weight of one or more acrylic resin dispersions; between about 5% to about 20% by weight of one or more coalescing agents; and between about 0 to about 40% by weight of a pigment dispersion.

According to another embodiment of the present invention there is provided a method of printing an image on a woven textile material. A base application is applied to at least a portion of the woven textile material corresponding to an area upon which the image is to be imprinted. The base application comprises an aqueous acrylic latex material, one or more acrylic resins separate from said latex material, and one or more coalescing agents. An ink image is printed onto at least a portion of the textile material containing the base application with one or more digital inks using an inkjet printer. The ink image is caused to cure upon the textile material thereby forming an imprinted textile article.

According to still other embodiments of the present invention there are provided printed articles formed according to the methods disclosed herein, and printed articles comprising the base application as disclosed herein.

According to an aspect of some embodiments of the present invention, there is provided a method of printing an ink image on a woven textile material, the method includes:

applying a base application to at least a portion of the woven textile material corresponding to an area upon which the image is to be imprinted, the base application which includes an aqueous acrylic latex material, one or more acrylic resins separate from the latex material, and one or more coalescing agents;

printing the ink image onto at least a portion of the textile material containing the base application with one or more digital inks using an inkjet printer; and causing the ink image to cure upon the textile material thereby forming an imprinted textile article.

According to some embodiments, the base application is applied using an inkjet print head.

According to some embodiments, the base application is applied to the textile material using one or more nozzles configured to generate a spray of fine droplets of the base application.

According to some embodiments, the base application further includes at least one of a viscosity control agent, a pigment, and a binder.

According to some embodiments, the step of applying the base application and the printing steps occur in succession without an intervening step of exposing the textile material to a temperature in excess of 120° F. so as to cause drying of the base application.

According to some embodiments, the step of causing the ink image to cure upon the textile material includes directing the textile material through drying apparatus operating at a temperature in excess of 150° F. for a period of at least 30 seconds.

According to some embodiments, the woven textile material is an article of clothing.

According to some embodiments, the method is performed using an in-line printing apparatus which includes a conveyor passing through a base application station in which the base application is applied to the woven textile material, and a printing station where the ink image is printed on the textile material.

According to some embodiments, the base application is not applied to any area of the woven textile material not also receiving the one or more digital inks.

According to some embodiments, the woven textile material includes a synthetic resin material.

According to some embodiments, the synthetic resin material is selected from the group consisting of fibers of polyester, polyethylene, polypropylene, nylon, and blends thereof.

According to some embodiments, the base application further includes one or more aziridine compounds.

According to some embodiments, the base application includes a first part including the aqueous acrylic latex material, and a second part including the one or more aziridine compounds.

According to some embodiments, the base application includes an enzyme.

According to an aspect of some embodiments of the present invention, there is provided a base application for use in a system for digitally printing an ink image on a woven textile material, which includes:

between about 30% to about 70% by weight of an aqueous acrylic latex material;

between about 2.5% to about 20% by weight of one or more acrylic resin dispersions;

between about 5% to about 20% by weight of one or more coalescing agents; and between about 0 to about 40% by weight of a pigment dispersion.

According to some embodiments, the base application has a total water content of between about 15% to about 75% by weight.

According to some embodiments, the base application further includes between about 0.01 to about 5% by weight of a binder, the binder which includes triethanolamine.

According to some embodiments, the base application is inkjettable and has a viscosity of between about 8 to about 60 cp.

According to some embodiments, the coalescing agent includes polyethylene glycol.

According to some embodiments, the base application is not formulated for use as an ink in forming an ink image.

According to some embodiments, the base application does not requiring drying prior to receiving one or more digital inks thereupon.

According to some embodiments, the base application further includes one or more aziridine compounds.

According to some embodiments, the base application includes a first part including the aqueous acrylic latex material, and a second part including the one or more aziridine compounds.

According to some embodiments, the base application includes an enzyme.

According to an aspect of some embodiments of the present invention, there is provided a printed article formed according to the method provided herein.

According to an aspect of some embodiments of the present invention, there is provided a printed article which includes the base application provided herein.

According to some embodiments, the article further includes an ink image deposited on top of the base application.

According to some embodiments, the printed article includes an article of clothing formed from a woven textile material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

BRIEF DESCRIPTION OF THE SEVERAL VIEWS OF THE DRAWING

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of an in-line printing system made in accordance with one embodiment of the present invention.

DESCRIPTION OF SPECIFIC EMBODIMENTS OF THE INVENTION

The printing systems described herein are universal in nature and are suitable for use in connection with substantially any natural and synthetic textile materials. However, the printing systems are particularly adapted to address problems associated with current methods of printing onto woven, synthetic resin textile materials. Exemplary woven, synthetic resin textile materials include those made from fibers of polyester, polyethylene, polypropylene, nylon, and blends of natural and synthetic fibers, e.g., cotton/polyester blends. Textiles comprising synthetic resin fibers, especially those made from polyester or polyester blends, generally demonstrate superior wicking and drying characteristics as compared to textiles made from natural fibers, such as cotton, thereby making them popular materials from which to make active wear. As noted previously, these textile materials can be dyed to assume any desired color. However, it is the presence of these dyes that complicates attempts to directly print an image onto articles made therefrom.

Certain embodiments of the present invention comprise utilizing an aqueous base application that is applied to the textile material prior to digital printing of an image thereon. In certain embodiments, the base application may function as a dye fixative or blocker that prevents the dyes from releasing from the textile fibers and degrading the quality of printed image. The base application comprises an aqueous acrylic resin latex material, particularly an acrylic resin latex emulsion, having a solids content of between about 30 to about 65 wt. %, between about 35 to about 55 wt. %, or between about 40 to about 50 wt. %. The acrylic resin latex emulsion may have a particle size of less than 0.5 micron, less than 0.2 micron, or less than 0.1 micron. The acrylic resin latex emulsion may have a minimum film-forming temperature (minimum temperature at which the latex forms a film) of between about −10 to about 50° C., between about −5 to about 25° C., or between about 0 to about 15° C. The acrylic resin latex emulsion may further be alkaline having a basic pH, and preferably a pH of greater than 8, or between about 8 to about 11, between about 8.5 to about 10.5, or between about 9 to about 10. Exemplary acrylic resin latex materials include ENCOR 627 (solids content of 43.5%, a particle size of 0.10 microns, a minimum filming temperature of 9° C., a pH of 9.8, and a glass transition temperature of 15° C.), ENCOR 2722 (an APE-free styrene acrylic polymer resin having a solids content of 42%, a minimum filming temperature of <5° C., and a pH of 8.7), or NEOCAR 850 (a hydrophobic latex with ambient self-crosslinking, a solids content of 45%, particle size 0.07 microns, viscosity (Brookfield LVT #3, 60 rpm) of 150 cp, a glass transition temperature (midpoint) of 50° C., and a minimum filming temperature of 45° C.) all from Arkema Coating Resins.

The base application may include one or more additional resins besides the acrylic resin latex material. These additional resins may also be acrylic polymers or copolymers, polyesters, epoxies, vinyl acrylates, or urethane acrylates that are dispersed in a solution or emulsion. In certain embodiments, the acrylic resins are provided as aqueous dispersions, comprising a solids content of between about 30 to about 60%, between about 35 to about 55% or between about 40 to about 50% by weight. The resins, including those contained in the acrylic latex material, may have a molecular weight of between about 1,000 to about 100,000 g/mol, between about 5,000 to about 50,000 g/mol, or between about 10,000 to about 25,000 g/mol. The resins, including those contained in the acrylic latex material, may exhibit a glass transition temperature of between about −45 to about 40° C., between about −25 to about 30° C., or between about −10 to about 20° C. An exemplary acrylic resin includes JONCRYL HPD 296 from BASF (comprising an ammonium salt of modified acrylic copolymers, solids content of 35.5%, molecular weight (wt. avg.) 11,500, Tg of 15° C., pH of 8.7).

In certain embodiments of the present invention, the base application may also comprise one or more aziridine compounds that assist with preventing migration of dyes released by the textile material fibers at temperatures exceeding 225° F. Aziridines are organic compounds containing the aziridine functional group, a three-membered heterocycle with one amine group and two methylene groups. According to certain embodiments of the present invention, the aziridine compound may be multi-functional, that is, comprise more than one aziridine moiety. In certain embodiments, the base application comprises a difunctional aziridine compound, a trifunctional aziridine compound, or a combination thereof. An exemplary polyfunctional aziridine compound is PZ-33 available from PolyAziridine, LLC, Medford, N.J., having the general formula:

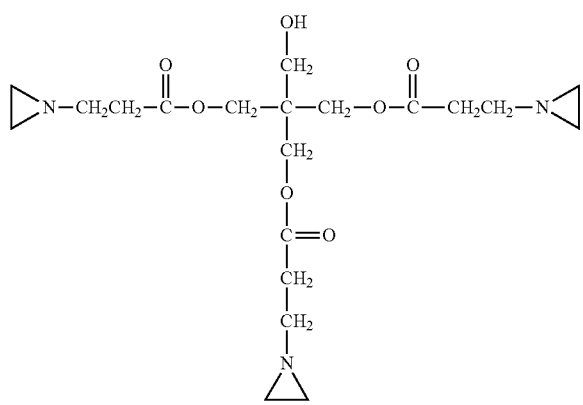

In particular embodiments, the one or more aziridine compounds are present in the base application at a level of between about 0.1% to about 6% by weight, between about 0.5% to about 4.5% by weight, or between about 1% to about 3% by weight.

The aziridine compound may be admixed directly with the rest of the base application and then applied as a one-part composition. However, in certain embodiments, the addition of the aziridine compound will result in the initiation of crosslinking of the resins contained in the base application. In embodiments in which the base application is to be applied via an inkjet printing system, initiation of crosslinking of the base application within the inkjet heads may lead to fouling of the inkjet heads. Therefore, it may be preferable to maintain the aziridine compound separate from the other components of the base application until these components have been discharged from the inkjet head. U.S. Pat. No. 8,092,003, incorporated by reference herein in its entirety, discloses a printing system in which the base application components and aziridine compound may be kept separate, until discharged toward or upon the receiving surface. Thus, in such embodiments, the base application comprises two separately applied parts: a first part comprising the acrylic resin latex, and a second part comprising the aziridine compound. It is noted too that both parts do not need to be applied using inkjet equipment, and do the parts need to be applied simultaneously. It is within the scope of the present invention for the aziridine compound to be applied in the form of a solution that is sprayed upon the textile material using a conventional spray nozzle, and then the acrylic latex portion can be selectively applied to the surface of the textile material using an inkjet printer.

When formulated as a two-party system, the aziridine-containing portion of the base composition may be provided as an aqueous dispersion or solution comprising between 0.1% to about 12% by weight, between about 0.5% to about 8% by weight, or between about 1 to about 6% by weight of the aziridine compound. A quantity of an alcohol, such as ethanol, may also be used in order to assist with formation of the aziridine-containing portion. In certain embodiments, the aziridine-containing portion and the acrylic resin latex portion of the base coating are applied to the target surface in similar proportions. Specifically, in particular embodiments, the aziridine-containing portion may be jetted from separate inkjet heads at the same rate as the acrylic resin latex portion.

After application of the base coating comprising one or more aziridine compounds, the reaction between the aziridine compounds and the resins contained within the base coating progress to completion within 24 hours, thereby rendering the aziridine residues substantially inert. The curing process can be accelerated through the application of heat to the textile material as discussed further below, which in turn causes oxidation of the aziridine compounds. Becoming inert decreases the likelihood that the aziridine residues present in the base formulation will cause skin irritation through use or wearing of the textile material. In certain embodiments, the cured base application containing aziridine residues are non-irritating and will not cause the user or wearer to develop dermatitis.

The base application is generally free from peroxide and formaldehyde compounds. Thus, certain embodiments of the present invention comprise less than 2%, less than 1%, less than 0.1%, or less than 0.01% by weight of peroxide and formaldehyde compounds.

In certain embodiments of the present invention, the base application may include an absorptive, carbon-based material, such as charcoal, graphite, or activated carbon that is capable of absorbing dyes released by the textile material thereby preventing transmission of the dye vapors into the final printed ink image. The absorptive carbon-containing material provides a barrier between the textile material and the printed ink image. The carbon-containing material can also be applied as yet another part of a multi-part base application system, in that it can be separately jetted through a different inkjet head that the acrylic resin latex portion and/or the aziridine-containing portion. The carbon-containing portion may be in the form of an aqueous dispersion and may comprise the carbon-containing material at a level of between about 0.1% to about 6% by weight, between about 0.5% to about 5% by weight, or between about 1% to about 3% by weight. The carbon-containing material should be reduced in size so as to render it jettable through 80 pL or smaller inkjet heads. The carbon-containing material may have an average particle size of less than 1 micron, less than 0.5 microns, or less than 0.1 microns.

In certain embodiments of the present invention, the base application may further comprise one or more enzymes that act as scavengers for neutralization of dye vapors released from the textile material. In particular embodiments, the one or more enzymes may be selected from the group consisting of proteases and alpha-amylases. The one or more enzymes may be mixed with the other components of the base application and then applied to the textile material, or the one or more enzymes can be formulated as a part of a two-part system, as described previously. The one or more enzymes may be present in the base application at a level of between about 0.01% to about 10% by weight, between about 0.1% to about 5% by weight, or between 0.5% to about 2% by weight, based upon the weight of the entire base application. The enzymes may be incorporated directly into the base application, or at least the acrylic resin latex portion of a multi-part base application system. Alternatively, the enzymes may be incorporated into any of the other portions or into its own separately-applied portion of the base application system.

The base application may optionally contain a pigment. The pigment can comprise, for example, an inorganic pigment and/or an organic pigment. Inorganic pigments can include, for example, silica, alumina, titanium dioxide, zinc sulfide, zinc oxide, antimony oxide, barium sulfate, calcium carbonate, or a combination thereof. Organic pigments can include, for example, polyamides, polyolefins, polyesters, or a combination thereof. In certain embodiments, the pigment is preferably white in color. It has been discovered that a white-pigmented base application helps avoid loss in color brightness of the ink image layer to be imprinted onto the textile material. As explained further below, if the base application is pigmented, application thereof to the textile material is preferably done in a controlled manner so that it is applied only to those portions of the textile material that will also receive the subsequent ink image layer. The pigment may be incorporated into the base application as a pigment dispersion having particle sizes of less than 1 micron, less than 0.5 microns, or less than 0.1 microns.

The pigments used herein may be supplied in granular or liquid form. The pigment may also be supplied as an aqueous dispersion. As used herein, the term "pigment" refers to an insoluble colorant or solid colorant particles that remain suspended or dispersed when introduced into a carrier fluid. Furthermore, it is to be understood that the term "pigment" is not meant to encompass a dye or water-soluble colorant containing particles that are fully dissolvent in the carrier fluid.

The amount of pigment used in accordance with the present invention can be effective to (1) maximize the curing rate of the adhesive composition, (2) impart the desired color to the adhesive composition and final printed ink image, (3) obtain the desired wetting ability, and/or (4) enhance receptivity to UV or LED energy.

The base application may also comprise one or more coalescing agents that assist in maintaining homogeneity of the base application. In certain embodiments, the coalescing agent may comprise a polyether compound, such as polyethylene glycol (PEG). In particular embodiments, the polyethylene glycol will be a lower-molecular-weight PEG, having a molecular weight of between about 300 to about 1000 g/mol, or between about 300 to about 500 g/mol. Another exemplary coalescing agent is dipropylene glycol n-propyl ether available as DOWANOL DPnP from Dow Chemical Company.

While in certain embodiments of the invention, no co-solvent is required to be used in connection with the acrylic resin latex material, solvents or thinning agents may be incorporated into the base application in order to provide viscosity control. In particular embodiments, the viscosity control agent may comprise an alcohol, such as diacetone alcohol.

In various embodiments, the base application can comprise at least one binder. For example, the adhesive composition can comprise at least about 0.01, 0.05, or 0.1 and/or not more than about 5, 3, or 1 weight percent of one or more binders. More particularly, the base application can comprise in the range of about 0.01 to 5, 0.05 to 3, or 0.1 to 1 weight percent of one or more binders. Triethanolamine is an exemplary binder that may be used with the present invention.

The base application can also contain, in addition to the components previously described, various optional composition enhancing materials such as surfactants, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Exemplary compositional ranges for the base application are summarized in Table 1 below. Unless stated otherwise, all composition values herein are approximate and in weight percent.

TABLE 1

Exemplary Compositional Ranges for Base Application

| Component | Broad | Intermediate | Narrow |
|---|---|---|---|
| Acrylic latex material[1] | 30-70% | 40-60% | 45-55% |
| Water[2] | 15-75% | 25-65% | 35-55% |
| Additional resins[3] | 0-20% | 2.5-15% | 5-10% |
| Pigment dispersion[4] | 0-40% | 10-30% | 15-25% |
| Coalescing Agent | 0-20% | 5-15% | 7.5-12.5% |
| Viscosity control agent | 0-5% | 0.1-2.5% | 0.5-1.5% |
| Binder | 0-2.5% | 0.01-1% | 0.1-0.5% |
| Optional composition enhancing materials[5] | 0-2.5% | 0.01-1% | 0.1-0.5% |

[1]Based upon an assumed 50% solids content.
[2]Total water content, including water content of other components supplied as emulsions or dispersions.
[3]Not including acrylic resins contained in the acrylic latex material, assumed to be supplied as a dispersion having a 50% solids content.
[4]Based upon an assumed 50% solids content.
[5]Per each optional component.

The base applications as described herein can have a low enough viscosity to be used in ink jet printers and, therefore, could be considered ink-jettable. For example, the base application, including each respective part of the base application in a multi-part system, can have a viscosity at 25° C. of at least about 8, 12, 15, or 18 and/or not more than about 60, 40, 30, or 23 centipoise as measured using a DV-II+ Pro Viscometer from Brookfield. More particularly, the base application can have a viscosity at 25° C. in the range of 8 to 60, 12 to 40, 15 to 30, or 18 to 23 centipoise.

The low viscosities permit the base application to be jetted through small diameter piezoelectric inkjet heads having nozzle diameters of between about 15 to about 60 microns. The base applications can be used in conjunction with heated inkjet heads that serve to lower the viscosity even further. The heated inkjet heads can heat the base application to temperatures of between 25 to 90, 30 to 80, or 35 to 50° C. Another advantage of low viscosity is that smaller drop sizes are possible. For example, the drop size of the compositions can be at least about 10, 20, or 30 and/or not more than about 200, 140, or 80 picoliters. More particularly, the drop size of the compositions can be in the range of about 10 to 200, 20 to 140, or 30 to 80 picoliters.

The base application may be applied to the target textile material in a number of ways. The base application may be applied indiscriminately over a large portion of the surface, or substantially all of the surface, of the textile material that is being imprinted. In these embodiments, it may be preferable for the base application to be clear or unpigmented as the area to which image will be subsequently imprinted may not exactly correspond with the area to which the base application is applied. However, as noted previously, in certain embodiments where the textile material has been dyed a deep color, the base application may be pigmented, preferably with white pigment, so as to prevent the textile coloring from transmitting through the image. In one embodiment, the base application may be applied by a misting system that is capable of delivering the base application to the textile material as a mist of fine droplets. In another embodiment, the base application may be applied more precisely using an inkjet printer. As the image is also printed with an inkjet printer, the deposit of the base application may be more precisely controlled so as correspond with the intended area over which the image layer is to be formed.

The image may be imprinted onto the textile material using nearly any desired digital printing system and ink that is formulated for printing upon woven textile materials. In certain embodiments, the ink system used for printing the image may be UV-curable, containing monomers, oligomers, and/or polymeric resins and a photoinitiator system for facilitating curing of the ink image. In other embodiments, the ink system may comprise various acrylic resins in an aqueous dispersion. One or more catalysts or cross-linking agents may be utilized, either directly in the ink system or applied simultaneously with the ink system to facilitate curing of the image. Exemplary inks and printing systems are disclosed in U.S. Pat. No. 8,092,003, incorporated by reference herein in its entirety.

Curing of the ink system may be accelerated through application of heat to the imprinted textile material. The imprinted textile material may be passed through drying apparatus configured to heat the textile material. In certain embodiments, the drying apparatus is configured to expose the textile material to temperatures in excess of 250° F., or between 250° F. to 300° F., or between 265° F. to 285° F. for a period of at least 1 minute, at least 3 minutes, or at least 5 minutes. In particular embodiments, the textile material may be exposed to such elevated temperature conditions within the drying apparatus for a period of 6 to 8 minutes.

As previously noted, exposure to such elevated temperature conditions may result in the release of dyes that had been previously applied to the textile material. However, the base application prevents transmission of the dyes into the ink image that might otherwise degrade the image quality. In certain embodiments of the present invention, the imprinted textile material may be exposed to temperatures in excess of 225° F., 250° F., 265° F., or 280° F., for periods of up to 5, 8 or 10 minutes without any perceptible transmission of dye into the ink image or change in image quality.

In certain embodiments, the base application permits the creation of the printed image on the textile material to be accomplished in a continuous, in-line printing process. Particularly, the need for an intermediate drying step between application of the base application and the ink image is avoided and the process may be considered a wet-on-wet printing process in which the base application may still be wet (i.e., not fully cured) at the time the subsequent ink image is created. Thus, in certain embodiments it is permissible for the base application and inks to be applied using the same inkjet press or successive in-line print heads. In particular embodiments, a dual-head printing system, such as disclosed in U.S. Pat. No. 8,092,003 may be used to deposit the inks in close succession to the base application.

In certain embodiments, the printing systems of the present invention are self-crosslinking or self-curing, which do not require the application of further energy to achieve full curing of the printed images. However, heat may be applied, such as through the use of the aforementioned drying apparatus, if it is desirable to accelerate the curing process. In certain embodiments of the present invention, the imprinted textile material is passed through drying apparatus operating at a temperature in excess of 150° F., in excess of 200° F., or in excess of 250° F. for a period of time of in excess of 30 sec, in excess of 1 min, or in excess of 5 minutes. In other embodiments, the imprinted textile material is passed through drying apparatus operating at a temperature of between about 150° F. to about 350° F., between about 200° F. to about 325° F., or between about 250° F. to about 300° F. for a period of time of between about 30 sec to about 10 minutes, between about 1 minute to about 9 minutes, or between about 5 minutes to about 8 minutes.

Certain embodiments of the present invention have the advantage in that very little to no external heat must be applied in order to print the image onto the textile material, which results in significant energy savings for the printer. Moreover the time to create a finished printed article is significantly reduced as intermediate baking cycles are avoided, as is the need to use an image transfer system.

The resulting ink image created on the article surface exhibits great durability and maintains its vividness and brightness even after being subjected to multiple washings and/or multiple dry cleaning sessions. For instance, the deposited ink image and base application can exhibit dimensional changes of not more than about 10.0×10.0, 5.0×5.0, or 2.0×2.0 percent after being subjected to 25 home launderings according to AATCC 135. This test is intended to determine the durability of the deposited ink image and base application on the textile surface after being subjected to multiple home laundering procedures used by consumers. The dimensional changes (in percent change) of the tested samples are measured after subjecting the samples to 25 cycles of home launderings. These tests are commonly performed in the industry by the Drycleaning & Laundry Institute (Laurel, Md.).

Similarly, the deposited ink image and base application can exhibit dimensional changes of not more than about 10.0×10.0, 5.0×5.0, or 2.0×2.0 percent after being subjected to 20 cycles of dry cleaning with perchloroethylene according to AATCC 158. This test is intended to determine the durability of the deposited ink image and base application on the textile surface after being subjected to multiple dry cleanings using a commercial dry cleaning machine. The dimensional changes (in percent change) of the tested samples are measured after subjecting the samples to 20 cycles of dry cleaning in perchloroethylene. These tests are commonly performed in the industry by the Drycleaning & Laundry Institute (Laurel, Md.).

Additionally, as noted above, the ink image created on the article according to the methods described herein can maintain its vividness and brightness even after being subjected to multiple washings. For example, the deposited and cured ink image can exhibit a colorfast score of at least 3, at least 4, or about 5 as measured according to AATCC 61. The AATCC 61 test shows color change comparable to twenty commercial launderings at 38±3° C. (100+5° F.). The grade ratings were determined through use of the AATCC Gray Scales for Color Change and Staining, which are scored from 1 to 5; in which 5 represents no or negligible change, 4 represents a slight change, 3 represents a noticeable change, and 1 represents much change. According to AATCC, the colorfastness grades of the scale steps and the corresponding total color differences and tolerances used are determined by the CIE L*a*b* (CIELAB) formula. Specific tolerances and instructions for use of the scale are given in AATCC Evaluation Procedure 1. These tests are commonly performed in the industry by the Drycleaning & Laundry Institute (Laurel, Md.).

Likewise, the ink image created on the article as described herein can maintain its vividness and brightness even after being subjected to multiple dry cleaning sessions. For example, the deposited and cured ink image can exhibit a colorfast score of at least 3, 4, or about 5 as measured according to AATCC 132-2009. The colorfastness is measured after the tested samples are subjected to 20 sessions of dry cleaning. The grade ratings were determined through use of the AATCC Gray Scales for Color Change and Staining, which are scored from 1 to 5; in which 5 represents no or negligible change, 4 represents a slight change, 3 represents a noticeable change, and 1 represents much change. According to AATCC, the colorfastness grades of the scale steps and the corresponding total color differences and tolerances used are determined by the CIE L*a*b* (CIELAB) formula. Specific tolerances and instructions for use of the scale are given in AATCC Evaluation Procedure 1. These tests are commonly performed in the industry by the Drycleaning & Laundry Institute (Laurel, Md.).

Furthermore, the base application assists in the adhesion of the image layer to the article. For example, the cured image layer can exhibit an adhesive strength of at least about 1, 3, or 6 lbs./in and/or not more than about 100, 50, or 25 lbs./in as measured according to ASTM D751-06. More particularly, the cured image layer can exhibit an adhesive strength in the range of about 1 to 100, 3 to 50, or 6 to 25 lbs./in as measured according to ASTM D751-06.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

The following examples set forth exemplary base applications in accordance with the present invention. It is to be understood, however, that these examples are provided by way of illustration and nothing therein should be taken as a limitation upon the overall scope of the invention.

Example 1

| Component | Description | Amount (wt. %) |
| --- | --- | --- |
| ENCOR 2722 | Acrylic resin latex (Arkema) | 48.62 |
| TEOA | Triethanolamine (Barton) | 0.2 |
| DEIONIZED WATER | Water | 12 |
| HPD 296 | Acrylic resin (BASF) | 7.5 |
| PEG 300 | Polyethylene glycol (BASF) | 10.3 |
| 21225 WHITE DISPERSION | Water-based pigment dispersion (Polymeric Imaging) | 20 |
| DIACETONE ALCOHOL | Viscosity modifier (Barton) | 1 |
| BYK 024 | Polysiloxane defoamer (BYK Chemie) | 0.38 |

Example 2

| Component | Description | Amount (wt. %) |
| --- | --- | --- |
| ENCOR 627 | Acrylic resin latex (Arkema) | 55.12 |
| TEOA | Triethanolamine (Barton) | 0.2 |
| DEIONIZED WATER | Water | 5 |
| HPD 296 | Acrylic resin (BASF) | 7.5 |
| PEG 300 | Polyethylene glycol (BASF) | 9.3 |
| 21225 WHITE DISPERSION | Water-based pigment dispersion (Polymeric Imaging) | 20 |
| DIACETONE ALCOHOL | Viscosity modifier (Barton) | 1 |
| BYK 024 | Polysiloxane defoamer (BYK Chemie) | 0.38 |

Example 3

| Component | Description | Amount (wt. %) |
| --- | --- | --- |
| NEOCAR 850 | Acrylic resin latex (Arkema) | 50.92 |
| DPNP | Dipropylene glycol n-propyl ether (Dow) | 3.7 |
| TEOA | Triethanolamine (Barton) | 0.2 |
| DEIONIZED WATER | Water | 7 |
| HPD 296 | Acrylic resin (BASF) | 7.5 |
| PEG 300 | Polyethylene glycol (BASF) | 9.3 |
| 21225 WHITE DISPERSION | Water-based pigment dispersion (Polymeric Imaging) | 20 |
| DIACETONE ALCOHOL | Viscosity modifier (Barton) | 1 |
| BYK 024 | Polysiloxane defoamer (BYK Chemie) | 0.38 |

FIG. 1 illustrates an exemplary in-line printing system 10 that may be used in one embodiment of the present invention. System 10 comprises a conveyor 12 configured to receive one or more pieces of a textile material. In this particular embodiment, the system 10 is configured to print images on articles of clothing, namely, T-shirts 14. Conveyor 12 directs T-shirt 14 through a base application station 16 in which a base application is applied thereto in any manner noted above. As noted previously, base application station 16 may comprise an inkjet printer or apparatus configured to supply the base application as a fine spray or mist. In certain embodiments, the base application can be applied as a single part, or as two parts, each of which is discharged toward T-shirt 14 from separate inkjet heads. Following deposit of the base application onto the surface of T-shirt 14, conveyor 12 directs the T-shirt toward a printing station 18 where the ink image is digitally printed thereon over at least a portion of the surface of the T-shirt upon which the base application was deposited. Digital printing station 18 may comprise an inkjet printer having multiple printing heads for applying ink upon the surface of T-shirt 14. Conveyor 12 may then direct T-shirt 14 through drying apparatus 20 for accelerated curing of the ink image.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of digital inkjet printing an image onto a substrate, comprising:
    applying a base application onto at least a portion of the substrate corresponding to an area upon which the image is to be imprinted;
    printing at least one digital ink onto at least said portion, while said portion is still wet by said base application, using an inkjet printer; and
    curing the image, thereby forming the image, wherein:
    said applying is effected by at least one applicator;
    said printing is effected by at least one inkjet printhead;
    said digital ink and said base application being kept separate from each other until discharged toward or upon the substrate, wherein said base application comprises:
    between about 30% to about 70% by weight of an aqueous acrylic latex material;
    between about 2.5% to about 20% by weight of one or more acrylic resin dispersions;
    between about 5% to about 20% by weight of one or more coalescing agents; and
    between about 0 to about 40% by weight of a pigment dispersion,
    said one or more acrylic resins are separate from said latex material, and
    said acrylic latex material is characterized by a minimum film-forming temperature that ranges from −10° C. to 50° C.

2. The method of claim 1, wherein said applicator is digitally controlled to apply said base application on said portion.

3. The method of claim 2, wherein said applicator is a spray nozzle or an inkjet printhead.

4. The method of claim 2, wherein said applicator is an inkjet printhead and said base application is characterized by a viscosity at 25° C. that ranges 8-60 centipoise.

5. The method of claim 3, wherein said at least one applicator is operable to generate a spray of said base application therefrom and said at least one inkjet printhead is operable to generate a spray of said digital ink therefrom.

6. The method of claim 5, wherein a spray pattern from said at least one applicator overlapping a spray pattern from said at least one inkjet printhead.

7. The method of claim 5, wherein said at least one applicator and said at least one inkjet printhead are operable to generate converging droplets of said base application and said digital ink, respectively.

8. The method of claim 5, effected such that droplets of said digital ink and droplets of said base application converge and contact each other prior to said droplets contacting said substrate.

9. The method of claim 7, effected such that droplets of said digital ink and droplets of said base application converge and contact each other subsequent to said droplets contacting said substrate.

10. The method of claim 1, wherein said curing is effected by exposing the image on the substrate to temperatures in excess of 100° C. for a period of at least 1 minute.

11. A method of digital inkjet printing an image onto a substrate, comprising:
    applying a base application onto at least a portion of the substrate corresponding to an area upon which the image is to be imprinted;
    printing at least one digital ink onto at least said portion using an inkjet printer; and
    curing the image, thereby forming the image, wherein:
    said applying is effected by at least one applicator;
    said printing is effected by at least one inkjet printhead;
    said digital ink and said base application being kept separate from each other until discharged toward or upon the substrate, wherein said base application comprises:
    between about 30% to about 70% by weight of an aqueous acrylic latex material;
    between about 2.5% to about 20% by weight of one or more acrylic resin dispersions;
    between about 5% to about 20% by weight of one or more coalescing agents; and
    between about 0 to about 40% by weight of a pigment dispersion,
    said one or more acrylic resins are separate from said latex material, and
    said acrylic latex material is characterized by a minimum film-forming temperature that ranges from −10° C. to 50° C.

12. The method of claim 11, wherein said printing is effected after said portion has dried.

13. The method of claim 11, wherein said applicator is digitally controlled to apply said base application on said portion.

14. The method of claim 13, wherein said applicator is a spray nozzle or an inkjet printhead.

15. The method of claim 13, wherein said applicator is an inkjet printhead and said base application is characterized by a viscosity at 25° C. that ranges 8-60 centipoise.

16. The method of claim 14, wherein said at least one applicator is operable to generate a spray of said base application therefrom and said at least one inkjet printhead is operable to generate a spray of said digital ink therefrom.

17. The method of claim 16, wherein a spray pattern from said at least one applicator overlapping a spray pattern from said at least one inkjet printhead.

18. The method of claim 11, wherein said curing is effected by exposing the image on the substrate to temperatures in excess of 100° C. for a period of at least 1 minute.

* * * * *